United States Patent
Mukherjee et al.

(10) Patent No.: US 7,243,262 B2
(45) Date of Patent: Jul. 10, 2007

(54) INCREMENTAL CHECKPOINTING IN A MULTI-THREADED ARCHITECTURE

(75) Inventors: Shubhendu S. Mukherjee, Framingham, MA (US); Steven K. Reinhardt, Vancouver, WA (US); Joel S. Emer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 472 days.

(21) Appl. No.: 10/651,376

(22) Filed: Aug. 29, 2003

(65) Prior Publication Data

US 2005/0050304 A1    Mar. 3, 2005

(51) Int. Cl.
*G06F 11/00* (2006.01)

(52) U.S. Cl. .............................. 714/15; 714/10; 714/11

(58) Field of Classification Search ................ 714/10, 714/11, 15
See application file for complete search history.

(56) References Cited

U.S. PATENT DOCUMENTS

| | | | |
|---|---|---|---|
| 5,938,775 A | 8/1999 | Damani et al. | |
| 6,023,772 A | 2/2000 | Fleming | |
| 6,058,491 A * | 5/2000 | Bossen et al. | 714/15 |
| 6,317,821 B1 | 11/2001 | Batten et al. | |
| 6,326,809 B1 | 12/2001 | Gambles et al. | |
| 6,519,730 B1 * | 2/2003 | Ando et al. | 714/746 |
| 6,598,122 B2 | 7/2003 | Mukherjee et al. | |
| 2001/0034854 A1 * | 10/2001 | Mukherjee | 714/5 |

OTHER PUBLICATIONS

Haitham Akkary, Michael A. Driscoll, "A Dynamic Multithreading Processor," Proceedings of the 31st Annual International Symposium on Microarchitecture, Nov. 30-Dec. 2, 1998, pp. 1-11, Dallas, Texas, USA.

Seon Wook Kim, Et Al., "Reference Idempotency Analysis: A Framework for Optimizing Speculative Execution," Proceedings of the SIGPLAN Symposium on Principals and Practice of Parallel Programming (PPoPP), Jun. 18-20, 2001, pp. 1-10, Snowbird, Utah, USA.

Deborah T. Marr, Et Al., "Hyper-Threading Technology Architecture and Microarchitecture," Intel Technology Journal QI, 2002, pp. 1-12.

Shubhendu S. Mukherjee, Et Al., "Detailed Design and Evaluation of Redundant Multithreading Alternatives," 29th Annual International Symposium on Computer Architecture (ISCA), 2002, pp. 1-12.

Steven K. Reinhardt, Shubhendu S. Mukherjee, "Transient Fault Detection via Simultaneous Multithreading," 27th Annual International Symposium on Computer Architecture, Jun. 2000, pp. 1-12.

* cited by examiner

*Primary Examiner*—Robert Beausoliel
*Assistant Examiner*—Charles Ehne
(74) *Attorney, Agent, or Firm*—Blakely, Sokoloff, Taylor & Zafman LLP

(57) ABSTRACT

A processor executes corresponding instruction threads as a leading thread and a trailing thread. For a selected instruction, processor state corresponding to the execution of the instruction is saved in a history buffer. This is performed before writing a result from the selected instruction to a destination register. The result from executing the selected instruction in the leading thread is compared to the result from executing the selected instruction in the trailing thread. If the comparison indicates a fault, then restoring the processor state corresponding to a previous instruction. Data from the history buffer is used to perform the restoration.

29 Claims, 8 Drawing Sheets

| Instruction Pointer | Old Destination Register Value | Register Map |
|---|---|---|
| | | |
| | | |
| | | |
| | | |
| | | |

FIG. 6

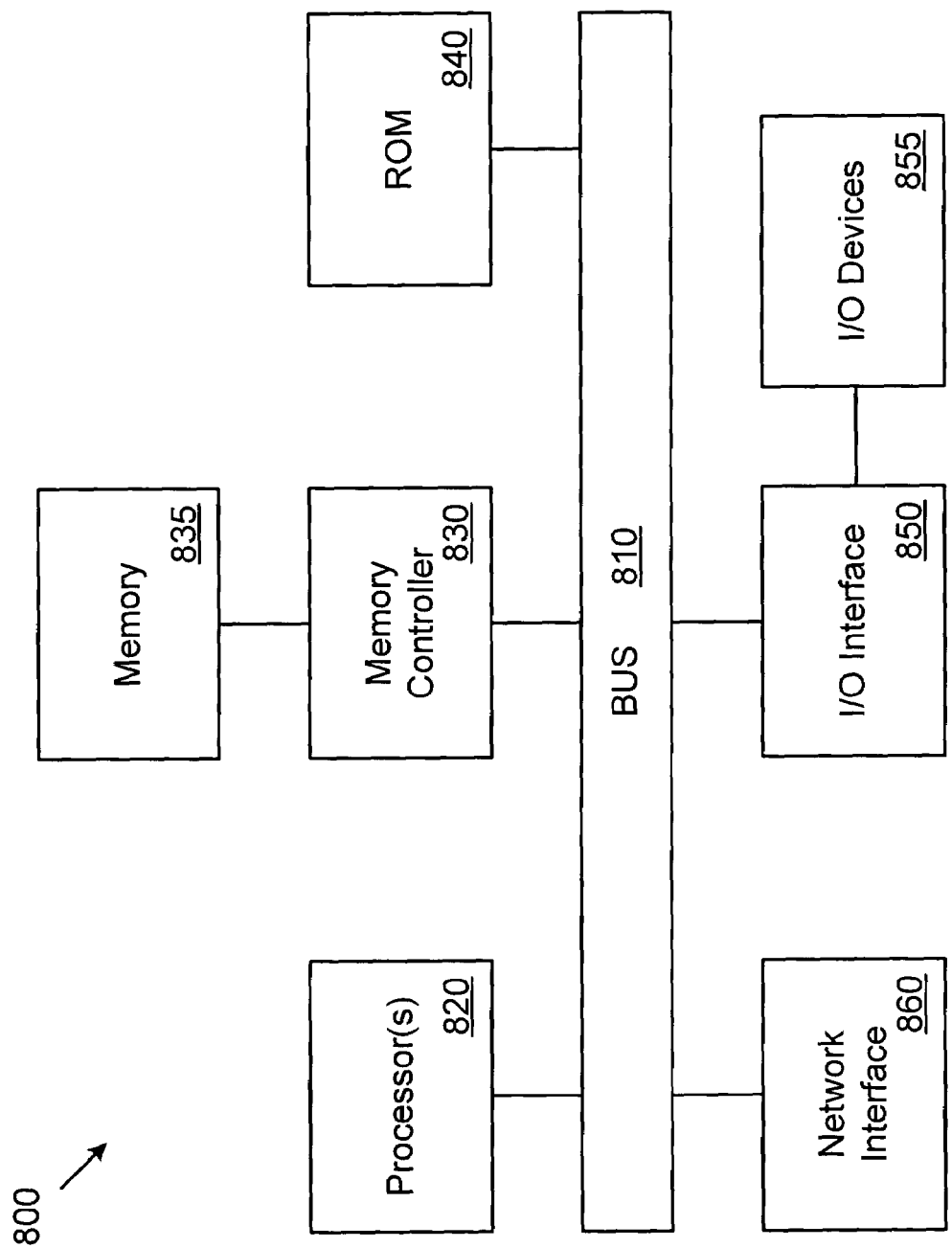

INCREMENTAL CHECKPOINTING IN A MULTI-THREADED ARCHITECTURE

RELATED APPLICATIONS

This U.S. Patent application is related to the following U.S. Patent applications:
(1) HARDWARE RECOVERY IN A MULTI-THREADED ARCHITECTURE, application number Ser. No. 08/877,994, filed Aug. 29, 2003; and
(2) PERIODIC CHECKPOINTING IN A REDUNDANTLY MULTI-THREADED ARCHITECTURE, application Ser. No. 08/879,315, filed Aug. 29, 2003.

1. Technical Field

The invention relates to multi-threaded computing architectures. More specifically, the invention relates to devices and techniques for incremental, periodic storage of checkpoints in a multi-threaded processor.

1. Background

Processors are becoming increasingly vulnerable to transient faults caused by alpha particle and cosmic ray strikes. These faults may lead to operational errors referred to as "soft" errors because these errors do not result in permanent malfunction of the processor. Strikes by cosmic ray particles, such as neutrons, are particularly critical because of the absence of practical protection for the processor. Transient faults currently account for over 90% of faults in processor-based devices.

As transistors shrink in size the individual transistors become less vulnerable to cosmic ray strikes. However, decreasing voltage levels the accompany the decreasing transistor size and the corresponding increase in transistor count for the processor results in an exponential increase in overall processor susceptibility to cosmic ray strikes or other causes of soft errors. To compound the problem, achieving a selected failure rate for a multi-processor system requires an even lower failure rate for the individual processors. As a result of these trends, fault detection and recovery techniques, typically reserved for mission-critical applications, are becoming increasing applicable to other processor applications.

Several terms are commonly used when discussing processor errors and error recovery. A Failure in Time (FIT) refers to an error rate of one failure in one billion ($10^9$) hours. Mean Time Between Failure (MTBF) is the time between failures caused by soft errors. MTBF requirements are typically expressed in years. For example, one FIT equals a MTBF of 114,155 years:

$$114{,}155 = \frac{10^9}{(24*365)}.$$

Silent Data Corruption (SDC) occurs when errors are not detected and may result in corrupted data values that can persist until the processor is reset. The SDC Rate is the rate at which SDC events occur. Soft errors are errors that are detected, for example, by using parity checking, but cannot be corrected. The rate of these detected, unrecoverable errors is referred to as the DUE rate.

For example, publicly available documents from IBM (D. C. Bossen, "CMOS Soft Errors and Server Design," IBM Server Group, Reliability Physics Tutorial Notes, Reliability Fundamentals, April 2002.), specify 25 years MTBF for DUE and 1000 years MTBF for SDC. These specifications are for single-processor systems. Application to a multi-processor system results in more stringent specifications for individual processors. It is becoming increasingly difficult to meet SDC and DUE FIT specifications because the neutron FIT contribution of latches is increasing. Other components, for example, most SRAM cells, either can be protected via interleaved parity or error correcting codes or do not provide significant contribution to the overall FIT rate.

The FIT rate of latches consists of two parts: the raw FIT rate and a derating factor. The raw FIT rate can be computed using circuit models and currently ranges between 0.001 and 0.01 per latch. The derating factor is the fraction of faults that lead to errors. Typically, the derating factor is 10%. See, for example, Eugene Normand, "Single Event Upset at Ground Level," IEEE Transactions on Nuclear Science, Vol. 43, No. 6, December 1996 and Y. Tosaka, et al., "Impact of Cosmic Ray Neutron Induced Soft Errors on Advanced Submicron CMOS Circuits," VLSI Symposium on VLSI Technology Digest of Technical Papers, 1996. Using the specifications set forth above as a further example, in a 64-processor system, each processor can have only approximately 1,800 latches. However, designing a complex, high-performance processor core with only 1,800 latches is extremely difficult.

Fault detection support can reduce a processor's SDC rate by halting computation before faults can propagate to permanent storage. Parity, for example, is a well-known fault detection mechanism that avoids silent data corruption for single-bit errors in memory structures. Unfortunately, adding parity to latches or logic in high-performance processors can adversely affect the cycle time and overall performance. Consequently, processor designers have resorted to redundant execution mechanisms to detect faults in processors.

Current redundant-execution systems commonly employ a technique known as "lockstepping" that detects processor faults by running identical copies of the same program on two identical lockstepped (cycle-synchronized) processors. In each cycle, both processors are fed identical inputs and a checker circuit compares the outputs. On an output mismatch, the checker flags an error and can initiate a recovery sequence. Lockstepping can reduce a processors SDC FIT by detecting each fault that manifests at the checker. Unfortunately, lockstepping wastes processor resources that could otherwise be used to improve performance.

BRIEF DESCRIPTION OF THE DRAWINGS

The invention is illustrated by way of example, and not by way of limitation, in the figures of the accompanying drawings in which like reference numerals refer to similar elements.

FIG. 6 is a conceptual illustration of one embodiment of a history buffer that can be used for incremental checkpointing.

FIG. 8 is a block diagram of an electronic system that can provide an environment for multithreaded processors.

DETAILED DESCRIPTION

Methods and apparatuses for incremental, periodic storage of checkpoints in a multi-threaded processor are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Sphere of Replication

Figure 1:
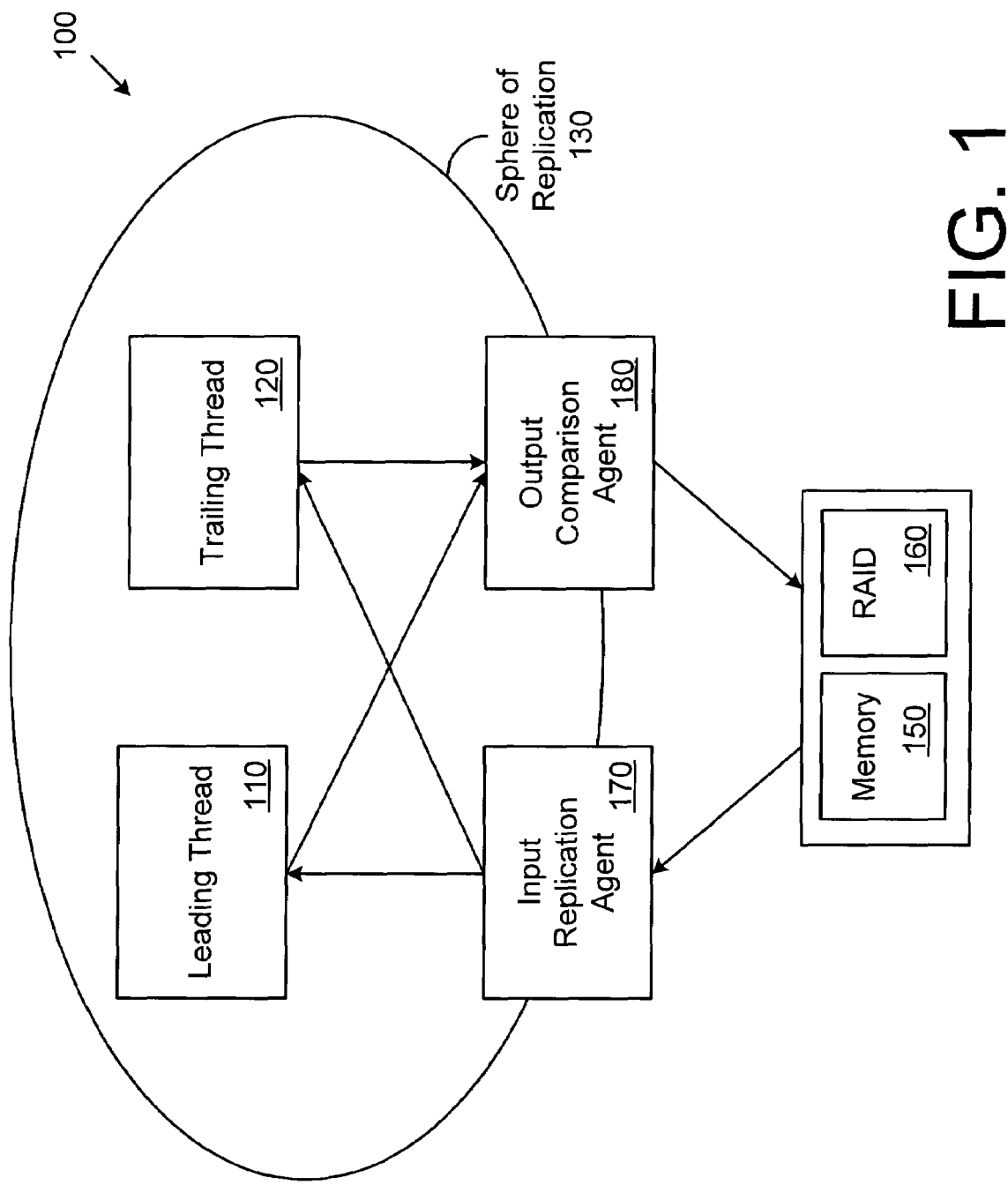
FIG. 1 is a block diagram of one embodiment of a redundantly multithreaded architecture with the redundant threads.

FIG. 1 is a block diagram of one embodiment of a redundantly multithreaded architecture. In a redundantly multithreaded architecture faults can be detected by executing two copies of a program as separate threads. Each thread is provided with identical inputs and the outputs are compared to determined whether an error has occurred. Redundant multithreading can be described with respect to a concept referred to herein as the "sphere of replication." The sphere of replication is the boundary of logically or physically redundant operation.

Components within sphere of replication 130 (e.g., a processor executing leading thread 110 and a processor executing trailing thread 120) are subject to redundant execution. In contrast, components outside sphere of replication 130 (e.g., memory 150, RAID 160) are not subject to redundant execution. Fault protection is provide by other techniques, for example, error correcting code for memory 150 and parity for RAID 160. Other devices can be outside of sphere of replication 130 and/or other techniques can be used to provide fault protection for devices outside of sphere of replication 130.

Data entering sphere of replication 130 enter through input replication agent 170 that replicates the data and sends a copy of the data to leading thread 1 10 and to trailing thread 120. Similarly, data exiting sphere of replication 130 exit through output comparison agent 180 that compares the data and determines whether an error has occurred. Varying the boundary of sphere of replication 130 results in a performance versus amount of hardware tradeoff. For example, replicating memory 150 would allow faster access to memory by avoiding output comparison of store instructions, but would increase system cost by doubling the amount of memory in the system.

In general, there are two spheres of replication, which can be referred to as "SoR-register" and "SoR-cache." In the SoR-register architecture, the register file and caches are outside the sphere of replication. Outputs from the SoR-register sphere of replication include register writes and store address and data, which are compared for faults. In the SoR-cache architecture, the instruction and data caches are outside the sphere of replication, so all store addresses and data, but not register writes, are compared for faults.

The SoR-cache architecture has the advantage that only stores (and possibly a limited number of other selected instructions) are compared for faults, which reduces checker bandwidth and improves performance by not delaying the store operations. In contrast, the SoR-register architecture requires comparing most instructions for faults, which requires greater checker bandwidth and can delay store operations until the checker determines that all instructions prior to the store operation are fault-free. The SoR-cache can provide the same level of transient fault coverage as SoR-register because faults that do not manifest as errors at the boundary of the sphere of replication do not corrupt the system state, and therefore, are effectively masked.

In order to provide fault recovery, each instruction result should be compared to provide a checkpoint corresponding to every instruction. Accordingly, the SoR-register architecture is described in greater detail herein.

Overview of Simultaneous and Redundantly Threaded Architecture

Figure 2:
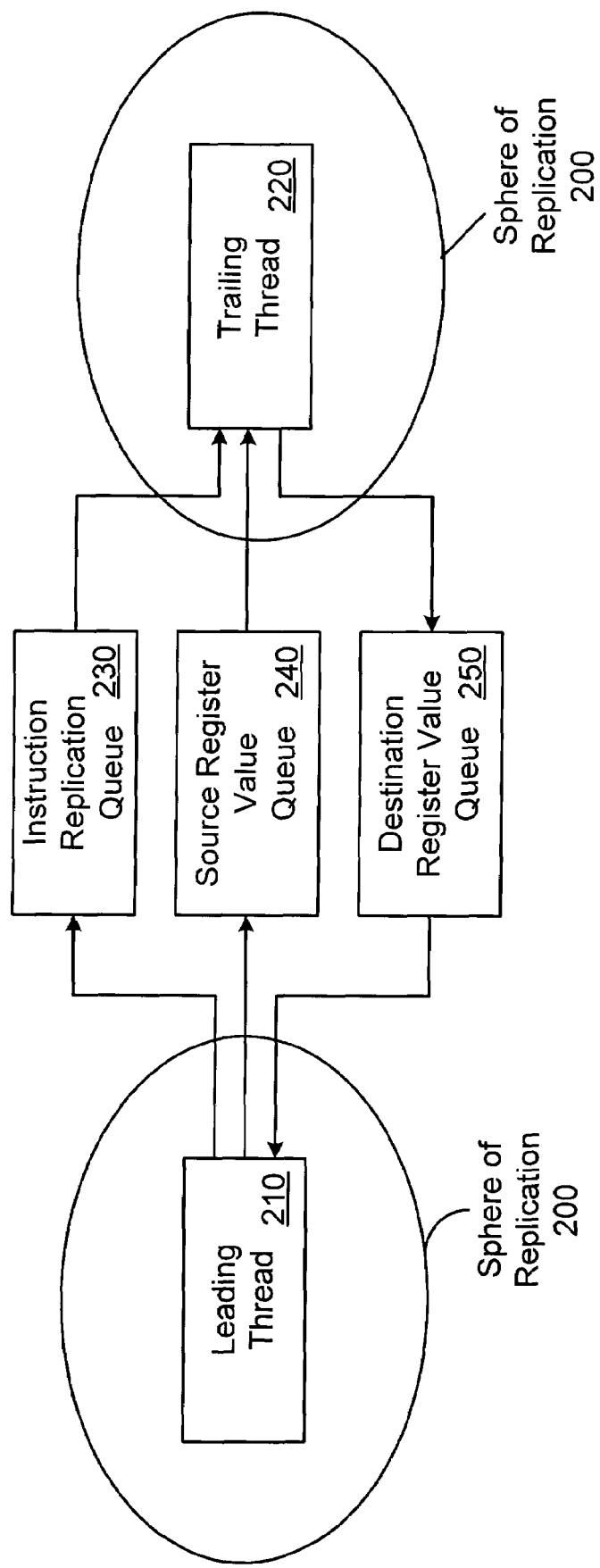
FIG. 2 is a block diagram of one embodiment of a simultaneous and redundantly threaded architecture.

FIG. 2 is a block diagram of one embodiment of a simultaneous and redundantly threaded architecture. The architecture of FIG. 2 is a SoR-register architecture in which the output, or result, from each instruction is compared to detect errors.

Leading thread 210 and trailing thread 220 represent corresponding threads that are executed with a time differential so that leading thread 210 executes instructions before trailing thread 220 executes the same instruction. In one embodiment, leading thread 210 and trailing thread 220 are identical. Alternatively, leading thread 210 and/or trailing thread 220 can include control or other information that is not included in the counterpart thread. Leading thread 210 and trailing thread 220 can be executed by the same processor or leading thread 210 and trailing thread 220 can be executed by different processors.

Instruction addresses are passed from leading thread 210 to trailing thread 220 via instruction replication queue 230. Passing the instructions through instruction replication queue 230 allows control over the time differential or "slack" between execution of an instruction in leading thread 210 and execution of the same instruction in trailing thread 220.

Input data are passed from leading thread 210 to trailing thread 220 through source register value queue 240. In one embodiment, source register value queue 240 replicates input data for both leading thread 210 and trailing thread 220. Output data are passed from trailing thread 220 to leading thread 210 through destination register value queue 250. In one embodiment, destination register value queue 240 compares output data from both leading thread 210 and trailing thread 220.

In one embodiment, leading thread 210 runs hundreds of instructions ahead of trailing thread 220. Any number of instructions of "slack" can be used. In one embodiment, the slack is caused by slowing and/or delaying the instruction fetch of trailing thread 220. In an alternate embodiment, the slack can be caused by instruction replication queue 230 or an instruction replication mechanism, if instruction replication is not performed by instruction replication queue 230.

Further details for techniques for causing slack in a simultaneous and redundantly threaded architecture can be found in "Detailed Design and Evaluation of Redundant Multithreading Alternatives," by Shubhendu S. Mukherjee, Michael Kontz and Steven K. Reinhardt in *Proc. 29th Int'l Symp. on Computer Architecture*, May 2002 and in "Transient Fault Detection via Simultaneous Multithreading," by Steven K. Reinhardt and Shubhendu S. Mukherjee, in *Proc. 27th Int'l Symp. on Computer Architecture*, June 2000.

Figure 3:
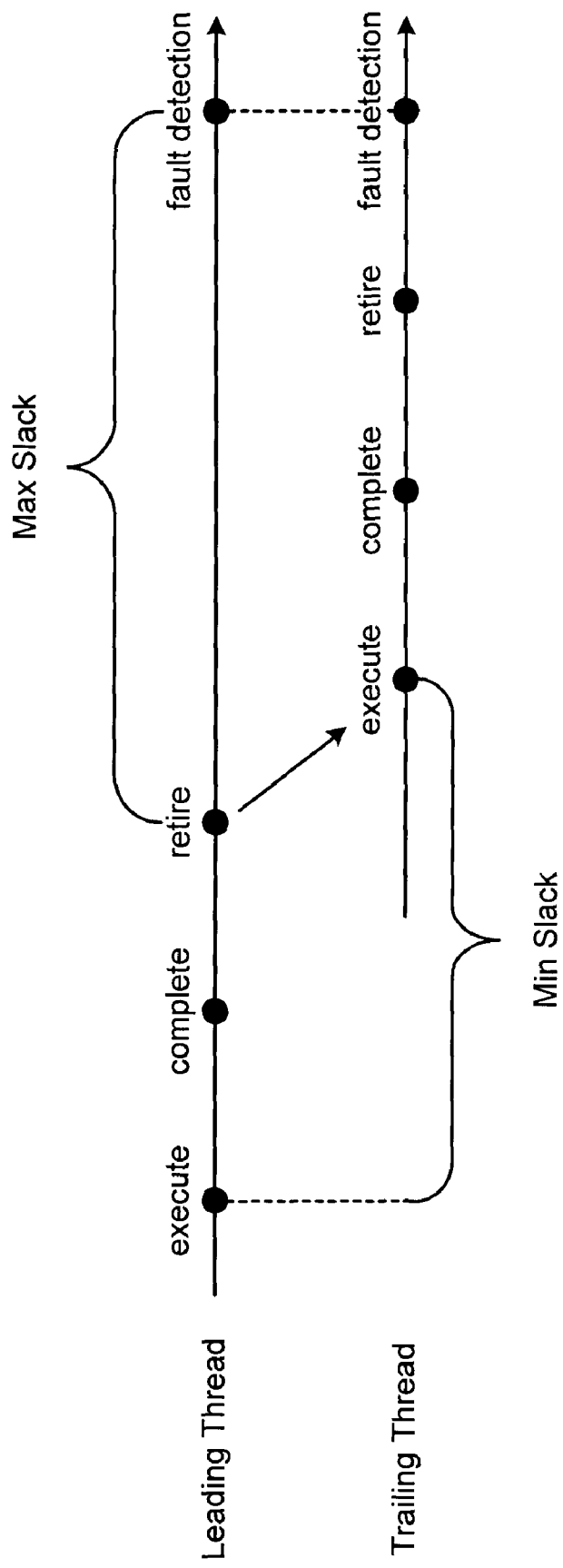
FIG. 3 illustrates minimum and maximum slack relationships for one embodiment of a simultaneous and redundantly multithreaded architecture.

FIG. 3 illustrates minimum and maximum slack relationships for one embodiment of a simultaneous and redundantly threaded architecture. The embodiment of FIG. 3 is a SoR-register architecture as described above. The minimum slack is the total latency of a cache miss, latency from execute to retire, and latency incurred to forward the load address and value to the trailing thread. If the leading thread suffers a cache miss and the corresponding load from the trailing thread arrives at the execution point before the minimum slack, the trailing thread is stalled.

Similarly, the maximum slack is latency from retire to fault detection in the leading thread. In general, there is a certain amount of buffering to allow retired instructions from the leading thread to remain in the processor after retirement. This defines the maximum slack between the leading and trailing threads. If the buffer fills, the leading thread is stalled to allow the trailing thread to consume additional instructions from the buffer. Thus, if the slack between the two threads is greater than the maximum slack, the overall performance is degraded.

Overview of Checkpointing and Backward Recovery

One fault-recovery technique, referred to as "backward recovery" involves restoring a system (e.g., a processor, a computer system) to an earlier fault-free state and re-executing a thread from the restoration point. A copy of the earlier state that can be restored is referred to as a "checkpoint." Backward recovery includes two issues to be addressed to provide transparent recovery: non-deterministic events and regenerated outputs.

If a non-deterministic event (e.g., an asynchronous interrupt) occurs after the last checkpoint re-execution after a fault may not follow the same path as the original execution. Specifically, if an externally visible output (e.g., a store) was generated along the original execution path prior to the fault, but the re-execution follows a different path that generates a different output, the resulting sequence of outputs, as observed from a reference external to the system, will not be consistent with fault-free execution and recovery will not be transparent. To prevent this occurrence, a backward recovery system must guarantee at each output operation that any subsequent fault-induced rollback will follow the same execution path up to the point of the output. This is referred to as the "output commit" problem.

Even if the re-execution deterministically follows the same path as the original execution, any externally visible output operations after the last checkpoint will be performed again during re-execution. If these output operations are not idempotent, then the re-execution will lead to behavior inconsistent with a fault-free execution and recovery will not be transparent.

One solution to both issues (non-deterministic events and regenerated outputs) is to create a new checkpoint automatically with each output operation. The checkpoint then incorporates any non-deterministic events that may have led to the execution of that output operation. If the output operation completes successfully, then any subsequent fault will roll back to the execution point after that operation and the output operation will not be re-executed.

Figure 4:
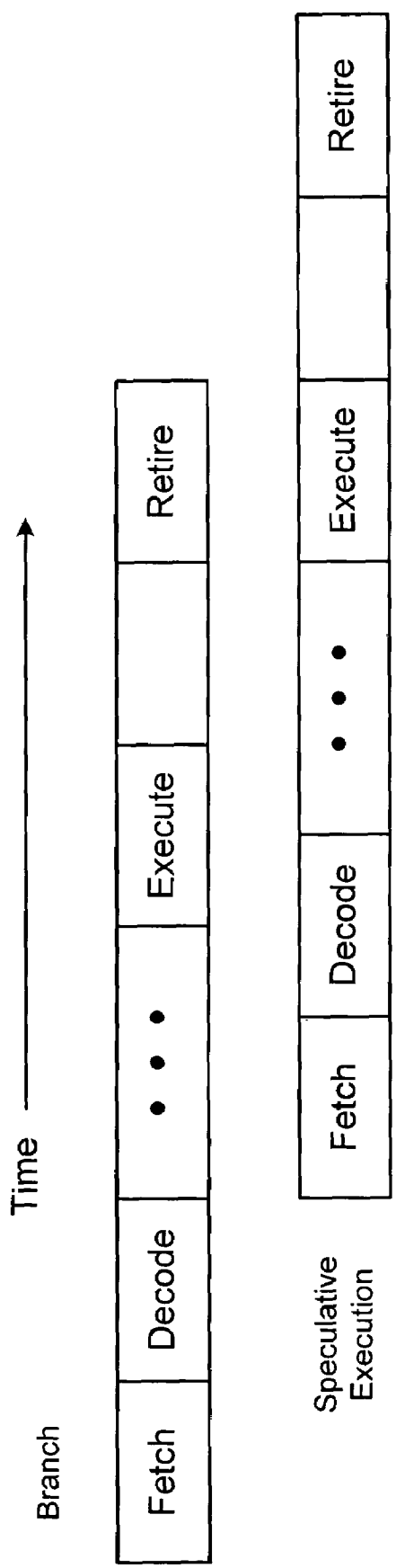
FIG. 4 illustrates a pipelined relationship between a branch instruction and a branch target instruction.

Deeply-pipelines processors typically predict branch directions and addresses to support speculative execution of instructions after the branch. As illustrated in FIG. 4, the outcome of the branch instruction is not determined until the instruction has been executed. Consequently, in the absence of branch prediction, instructions following the branch may be delayed. This is one reason that deeply-pipelined processors support aggressive branch prediction and recovery mechanisms. On branch misprediction, the processor can recover the processor state at the branch instruction and restart the pipelined instructions.

One solution to provide checkpointing is to store the complete architectural register file at each branch instruction. This solution could be expensive in terms of increased hardware requirements and performance loss. Consequently, processors can use incremental checkpointing in which for each instruction the prior value of a register is stored before a new value is written to the register. Then, to recover from a branch misprediction, the processor restores the most recent register values from the table.

This incremental checkpoint can be further optimized. In dynamically-scheduled processors that include more registers than are supported in the instruction set architecture, these processors create a mapping form the architectural register space (as supported in the instruction set) to the physical register space (as supported by the physical implementation). The destination register of an instruction is mapped to a physical register. When a new physical mapping is created for an architectural register, the previous mapping of the register is stored (e.g., in a table). To recover from a branch, the correct register mapping is restored at the point of the branch. Restoring the mapping is simpler than restoring the register values because the number of map bits required is typically smaller than, for example, 64-bit register values.

Overview of Simultaneous and Redundantly Threaded Architecture with Recovery

The simultaneous and redundantly threaded architecture with recovery (SRTR) architecture extends the simultaneous and redundantly threaded (SRT) architecture to support hardware recovery. The SRTR architecture provides recovery support through use of periodic checkpointing mechanisms for recovery purposes. A deeply-pipelined processor can include a checkpointing mechanism to recover from branch mispredictions. A processor having a SRTR architecture can use a modified checkpointing technique to recover from transient hardware faults.

In order to provide recovery from transient hardware faults the processor architecture performs fault detection prior to the instruction's retire point. The fault detection prior to the retire point is caused by the processor freeing the checkpoint corresponding to an instruction when the instruction is retired.

Figure 5:
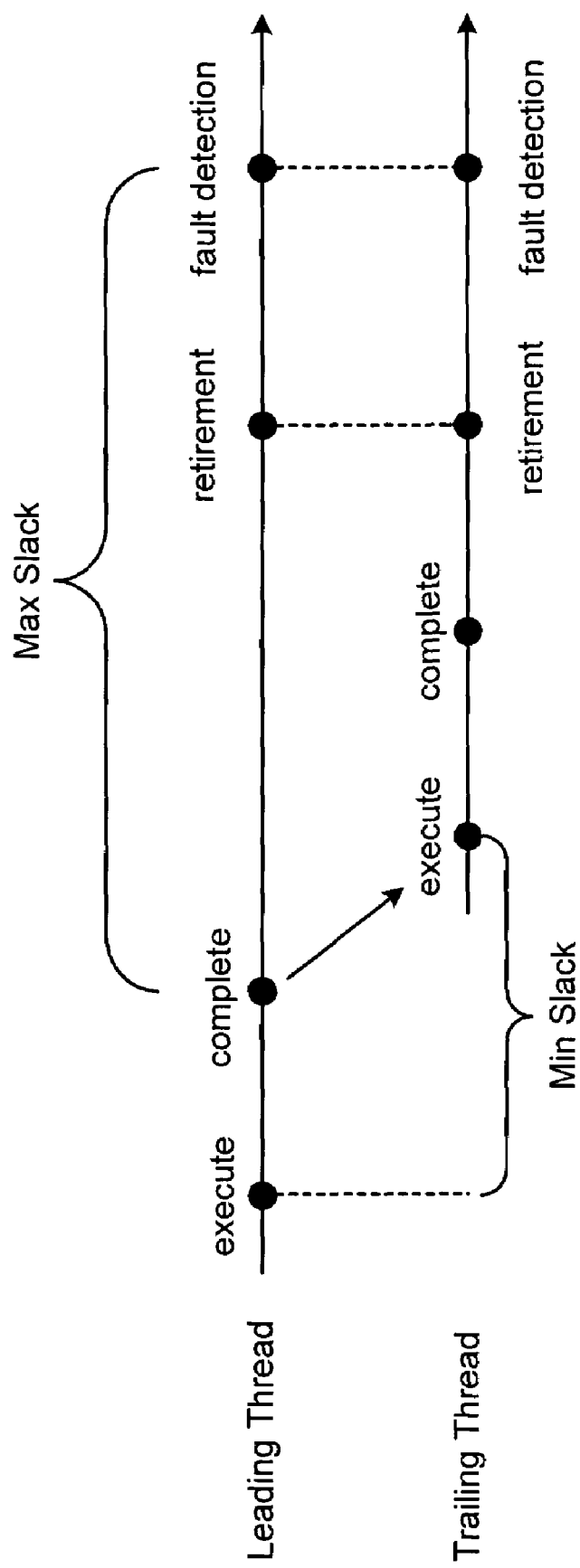
FIG. 5 illustrates minimum and maximum slack relationships for one embodiment of a simultaneous and redundantly multithreaded architecture with recovery.

FIG. 5 illustrates minimum and maximum slack relationships for one embodiment of a simultaneous and redundantly multithreaded architecture with recovery. Providing fault detection prior to the time at which an instruction is retired reduces the maximum allowed slack between the leading thread and the trailing thread as compared to the SRT architecture. In the SRT architecture, load addresses and values are forwarded from the leading thread to the trailing thread after the load instruction is retired. Because the SRTR architecture performs fault detection prior to retirement of the load instruction, the leading thread forwards load addresses and values to the trailing thread after the load execution is complete, but before the load instruction is retired. Consequently, the source register value queue (as illustrated in FIG. 2) is not a first-in/first-out (FIFO) queue, but is a speculative structure that can recover from branch mispredictions.

The SRTR architecture has a lower maximum slack compared to the SRT architecture because the maximum slack is the latency between the completion and fault detection point of an instruction. Increasing this latency is a more complex design issue than increasing the maximum slack in the SRT architecture. This is because instructions that have been executed but have not yet been retired cannot commit the results to the destination register in the architectural register file until the instructions have passed the fault detection and retirement stages.

One Embodiment of a Technique to Use a History Buffer for Incremental Checkpointing FIG. 6 is a conceptual illustration of one embodiment of a history buffer that can be used for incremental checkpointing. In one embodiment, the history buffer is a table with multiple entries. Each entry includes information related to a retired instruction, for example, the instruction pointer, the old destination register value and the physical register to which the destination architecture register is mapped. Other and/or different data can be stored in the history buffer.

The instruction pointer can be either the program counter or an implementation-dependent instruction number. The old destination value records the value of the register before the associated instruction rewrote the register with a new value. The register map identifies which physical register was updated. The number of entries in the history buffer is dependent on the implementation and, in one embodiment, is chosen to avoid pipeline stalls; however, other factors can be considered when implementing the history buffer. Only one history buffer is required for a pair of redundant threads.

When an instruction is retired and before the results are written to the destination register in the architecture register file, an entry is created in the history buffer with, in one embodiment, the instruction pointer, old destination register file and register map. Reading the old register value from the architecture register file may require an additional read port in the register file. By updating the history buffer when an instruction is retired an incremental checkpoint corresponding the processor state at the time the instruction is retired is created.

When a retired instruction passes the fault detection stage, the corresponding entry in the history buffer can be freed. Passing the fault detection stage indicates that execution of the instruction has been completed fault-free and the corresponding checkpoint is no longer needed. During the period when data is stored in the history buffer, the entries of the history buffer are used to restore the architectural state corresponding to a checkpoint.

Overview of Recovery Using the History Buffer

Figure 7:
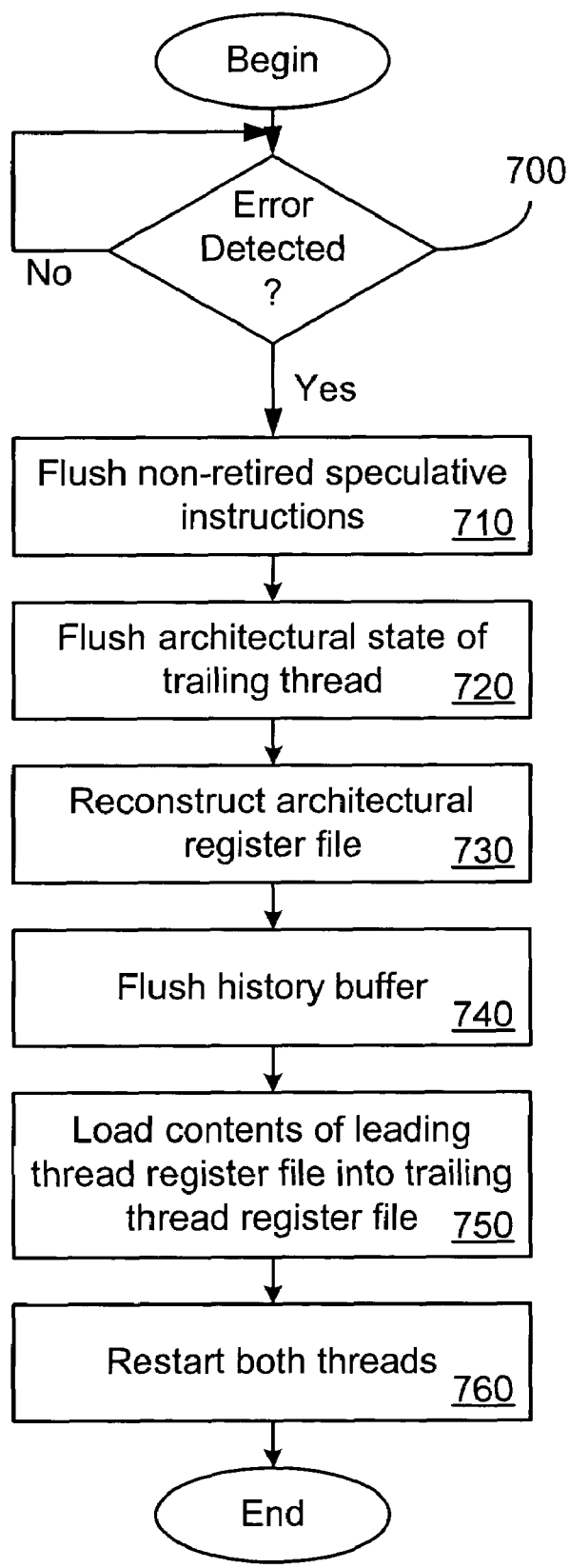
FIG. 7 is a flow diagram of one embodiment of error recovery using a history buffer.

FIG. 7 is a flow diagram of one embodiment of error recovery using a history buffer. Fault detection operates as described above by comparing output data from the leading thread and the trailing thread and storing data in the history buffer. When no error is detected at 700 both threads continue to execute. When an error is detected at 700 error recovery using the history buffer is triggered.

When the fault detection mechanism detects an error in a retired instruction, the recovery mechanism causes both threads to flush all speculative instructions that have not been retired, 710. The architectural state of the trailing thread is also flushed, 720. In one embodiment, flushing the architectural state of the trailing thread includes flushing the architectural register file of the trailing thread.

The architectural register file of the leading thread is reconstructed, 730. In one embodiment, the contents of the history buffer and the contents of the register file are used to reconstruct the architectural file corresponding to the preceding checkpoint. The architectural register file includes correct values up to the last retired instruction.

The values are rolled back to the instruction for which the fault was detected. In one embodiment, this is accomplished by finding the oldest update to each register from the history buffer. The history buffer is flushed, 740, after the architectural register file is reconstructed.

The contents of the leading thread architectural register file are loaded to the architectural register file of the trailing thread, 750. Both threads are restarted at the instruction that caused the fault, 760.

Logically, the history buffer is outside of the sphere of replication. In one embodiment, all instructions entering the history buffer are compared for mismatch. This can be accomplished via the fault detection mechanism. In one embodiment, the history buffer is protected with ECC to allow recovery on a single strike to the history buffer. In one embodiment, all data paths and logic from the fault detection module to the history buffer are protected, for example, via ECC or dual-rail logic.

Example of a System

FIG. 8 is a block diagram of an electronic system that can provide an environment for multithreaded processors. The electronic system illustrated in FIG. 8 is intended to represent a range of electronic systems. Alternative electronic systems can include more, fewer and/or different components.

Electronic system 800 includes bus 810 or other communication device to communicate information, and processor(s) 820 coupled to bus 810 to process information. Electronic system 800 further includes random access memory (RAM) or other dynamic memory as well as static memory, for example, a hard disk or other storage device 835 (referred to as memory), coupled to bus 810 via memory controller 830 to store information and instructions to be executed by processor(s) 820. Memory 835 also can be used to store temporary variables or other intermediate information during execution of instructions by processor(s) 820. Memory controller 830 can include one or more components to control one or more types of memory and/or associated memory devices. Electronic system 800 also includes read only memory (ROM) and/or other static storage device 840 coupled to bus 810 to store static information and instructions for processor(s) 820.

Electronic system 800 can also be coupled via bus 810 to input/output (I/O) interface 850. I/O interface 850 provides an interface to I/O devices 855, which can include, for example, a cathode ray tube (CRT) or liquid crystal display (LCD), to display information to a computer user, an alphanumeric input device including alphanumeric and other keys and/or a cursor control device, such as a mouse, a trackball, or cursor direction keys. Electronic system 800 further includes network interface 860 to provide access to a network, such as a local area network, whether wired or wireless.

Instructions are provided to memory 835 from a storage device, such as magnetic disk, a read-only memory (ROM) integrated circuit, CD-ROM, DVD, via a remote connection (e.g., over a network via network interface 860) that is either wired or wireless, etc. In alternative embodiments, hard-wired circuitry can be used in place of or in combination with software instructions. Thus, execution of sequences of instructions is not limited to any specific combination of hardware circuitry and software instructions.

CONCLUSION

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   executing corresponding instruction threads as a leading thread and a trailing thread;
   saving a processor state corresponding to execution of a selected instruction in a history buffer in connection with retiring the selected instruction and before committing a result from the selected instruction to a destination register;
   after retiring the selected instruction and committing the result from the selected instruction to the destination register, comparing the result from the selected instruction executed in the leading thread to the result from the selected instruction executed in the trailing thread; and
   restoring the processor state corresponding to a previous instruction using data from the history buffer if the comparison indicates a fault.

2. The method of claim 1 wherein the leading thread and the trailing thread are executed by a single processor.

3. The method of claim 1 wherein the leading thread and the wailing thread are executed by multiple processors.

4. The method of claim 1 Wherein the processor state is stored in an entry in the history buffer that stores an instruction pointer to the selected instruction, a value stored in the destination register, wherein the value in the destination register is to be overwritten by the result of the selected instruction, and a register map that indicates a mapping of one or more architectural registers to one or more physical registers.

5. The method of claim 1 wherein restoring the processor state corresponding to a previous instruction if the comparison indicates a fault comprises:
   selectively flushing results of instructions that started execution after an instruction causing the fault started execution;
   restoring architectural state to a checkpoint corresponding to a state at which the instruction causing the fault started execution, wherein at least a portion of the restored architectural state is retrieved from the history buffer.

6. The method of claim 5 wherein selectively flushing results of instructions that started execution after an instruction causing the fault started execution comprises:
   flushing non-retired speculative instructions from the leading thread execution circuitry;
   flushing an architectural state of the trailing thread from the trailing thread execution circuitry; and
   flushing the history buffer after register values used to restore the architectural state to the checkpoint are retrieved.

7. The method of claim 5 wherein the checkpoint corresponds to the architectural state at a time at which execution of the instruction causing the fault is started.

8. The method of claim 5 wherein the checkpoint corresponds to the architectural state at a time prior to which execution of the instruction causing the fault is started.

9. The method of claim 5 wherein restoring architectural state to a checkpoint corresponding to a state at which the instruction causing the fault started execution, wherein at least a portion of the restored architectural state is retrieved from a history buffer comprises:
   retrieving previous register values for registers written by or subsequent to the instruction causing the fault from the history buffer for the leading thread;
   restoring the previous register values to provide a restored architectural state for the leading thread; and
   copying the restored architectural state for the leading thread to an architectural register file for the trailing thread to provide a restored architectural state for the trailing thread.

10. The method of claim 1 wherein the selected instruction comprises a branch instruction.

11. An apparatus comprising:
    means for executing corresponding threads as a leading thread and a trailing thread;
    means for saving a processor state corresponding to execution of a selected instruction in connection with retiring the selected instruction and before committing a result from the selected instruction to a destination register;
    means for, after retiring the selected instruction and committing the result from the selected instruction to the destination register, comparing the result from the selected instruction executed in the leading thread to the result from the selected instruction executed in the trailing thread; and
    means for restoring the processor state corresponding to a previous instruction if the comparison indicates a fault.

12. The apparatus of claim 11 wherein the means for restoring the processor state corresponding to a previous instruction if the comparison indicates a fault comprises:
    means for selectively flushing results of instructions that started execution after an instruction causing the fault started execution;
    means for restoring architectural state to a checkpoint corresponding to a state at which the instruction causing the fault started execution, wherein at least a portion of the restored architectural state is retrieved from a history buffer.

13. The apparatus of claim 11 wherein the means for selectively flushing results of instructions that started execution after an instruction causing the fault started execution comprises:
    means for flushing non-retired speculative instructions from a thread having the instruction that caused the fault;
    means for flushing an architectural state of a trailing thread having the instruction that caused the fault; and
    means for flushing a history buffer after register values used to restore the architectural state to the checkpoint are retrieved.

14. An apparatus comprising:
    leading thread execution circuitry to execute a leading thread of instructions;
    trailing thread execution circuitry to execute a trailing thread of instructions; and
    a history buffer coupled with the leading thread execution circuitry and the trailing thread execution circuitry to store information related to execution of a selected instruction from the leading thread of instructions, wherein the information related to execution of the selected instruction is stored in connection with retiring the selected instruction and before committing a result of the instruction to a destination register, wherein execution fault detection is performed after the selected instruction has been retired and the result of the instruction has been committed to the destination resister, and wherein the information stored in the history buffer is used to restore an architectural state corresponding to a checkpoint if an execution fault is detected.

15. The apparatus of claim 14 wherein the history buffer stores an instruction pointer to the selected instruction, a value stored in the destination register, wherein the value in the destination register is to be overwritten by the result of the selected instruction, and a register map that indicates a mapping of architectural registers to physical registers.

16. The apparatus of claim 15 wherein the architectural state corresponding to the checkpoint is restored by selectively flushing results of instructions that started execution after an instruction causing the fault started execution and restoring architectural state to a checkpoint corresponding to a state at which the instruction causing the fault started execution, wherein at least a portion of the restored architectural state is retrieved from the history buffer.

17. The apparatus of claim 16 wherein the architectural state corresponding to the checkpoint is restored by flushing non-retired speculative instructions from the execution circuitry corresponding to the thread having an instruction that caused the fault, flushing an architectural state of the execution circuitry corresponding to the thread having the instruction that caused the fault, and flushing the history buffer after register values used to restore the architectural state to the checkpoint are retrieved.

18. The apparatus of claim 14 wherein the execution fault is caused by a branch instruction.

19. The apparatus of claim 14 wherein the checkpoint corresponds to the architectural state at a time at which an instruction causing the fault is started.

20. The apparatus of claim 14 wherein the checkpoint corresponds to the architectural state at a time prior to which an instruction causing the fault is started.

21. The apparatus of claim 14 wherein the leading thread execution circuitry and the trailing thread execution circuitry are part of a single processor.

22. The apparatus of claim 14 wherein the leading thread execution circuitry is part of a first processor and the trailing thread execution circuitry are part of a second processor.

23. A system comprising:
leading thread execution circuitry to execute a leading thread of instructions;
trailing thread execution circuitry to execute a trailing thread of instructions;
an input/output controller coupled with the leading thread execution circuitry; and
a history buffer coupled with the leading thread execution circuitry and the trailing thread execution circuitry to store information related to execution of a selected instruction from the leading thread of instructions, wherein the information related to execution of the selected instruction is stored in connection with retiring the selected instruction and before committing a result of the instruction to a destination register, wherein execution fault detection is performed after the selected instruction has been retired and the result of the instruction has been committed to the destination resister, and wherein the information stored in the history buffer is used to restore an architectural state corresponding to a checkpoint if an execution fault is detected.

24. The system of claim 23 wherein the history buffer stores an instruction pointer to the selected instruction, a value stored in the destination register, wherein the value in the destination register is to be overwritten by the result of the selected instruction, and a register map that indicates a mapping of architectural registers to physical registers.

25. The system of claim 24 wherein the architectural state corresponding to the checkpoint is restored by selectively flushing results of instructions that started execution after an instruction causing the fault started execution and restoring architectural state to a checkpoint corresponding to a state at which the instruction causing the fault started execution, wherein at least a portion of the restored architectural state is retrieved from the history buffer.

26. The system of claim 25 wherein the architectural state corresponding to the checkpoint is restored by flushing non-retired speculative instructions from the execution circuitry corresponding to the thread having an instruction that caused the fault, flushing an architectural state of the execution circuitry corresponding to the thread having the instruction that caused the fault, and flushing the history buffer after register values used to restore the architectural state to the checkpoint are retrieved.

27. The system of claim 23 wherein the execution fault is caused by a branch instruction.

28. The system of claim 23 wherein the checkpoint corresponds to the architectural state at a time at which an instruction causing the fault is started.

29. The system of claim 23 wherein the leading thread execution circuitry is part of a first processor and the trailing thread execution circuitry are part of a second processor.

* * * * *

UNITED STATES PATENT AND TRADEMARK OFFICE
CERTIFICATE OF CORRECTION

PATENT NO. : 7,243,262 B2 Page 1 of 1
APPLICATION NO. : 10/651376
DATED : July 10, 2007
INVENTOR(S) : Mukherjee et al.

It is certified that error appears in the above-identified patent and that said Letters Patent is hereby corrected as shown below:

In column 9, at line 32, delete "Wherein" and insert --wherein--.

Signed and Sealed this

Eighth Day of April, 2008

JON W. DUDAS
*Director of the United States Patent and Trademark Office*